United States Patent

[11] 3,575,442

[72] Inventors James O. Elliott
 Xenia;
 James E. Whelan, Dayton, Ohio
[21] Appl. No. 841,266
[22] Filed July 14, 1969
[45] Patented Apr. 20, 1971
[73] Assignee General Motors Corporation
 Detroit, Mich.

[54] SEMI-AUTOMATIC DOOR ACTUATED VEHICLE LEVELING SYSTEM
 6 Claims, 3 Drawing Figs.
[52] U.S. Cl. .................................................. 280/124, 267/65
[51] Int. Cl. ............................................... B60g 17/00
[50] Field of Search ......................................... 280/124, 6; 267/64, 65

[56] References Cited
 UNITED STATES PATENTS
3,063,734 11/1962 Davies.......................... 280/124
3,068,023 12/1962 Fiala............................. 280/124
3,083,984 4/1963 French.......................... 280/124

Primary Examiner—Philip Goodman
Attorneys—W. E. Finken and J. C. Evans

ABSTRACT: In the preferred form, a vehicle leveling system having an electrically motor driven compressor that is directly communicated with a pair of fluid springs for maintaining a predetermined height relationship between the sprung and unsprung mass of a vehicle. A controller includes vehicle door operated light switches normally opened when the vehicle doors are closed. When the door is opened and closed a hold circuit is closed for a relay-operated motor energization switch. The hold circuit includes a normally closed pressure responsive switch. Following a predetermined pump-up phase a mechanically operated height controller exhausts the spring and conditions the pressure switch to open the hold circuit to deenergize the electric motor.

Patented April 20, 1971

3,575,442

INVENTORS
James O. Elliott &
James E. Whelan

BY

J. C. Evans

ATTORNEY

SEMI-AUTOMATIC DOOR ACTUATED VEHICLE LEVELING SYSTEM

This invention relates to vehicle leveling systems and more particularly to vehicle leveling systems of the type including an electric motor driven compressor for varying the pressure level in fluid spring components so as to maintain a predetermined height relationship between the sprung and unsprung mass of a vehicle.

In vehicle suspension systems it is desirable to include inflatable auxiliary load supporting fluid spring components that are operated in accordance with changes in the static load on the vehicle to maintain a predetermined desired height relationship between the sprung and unsprung masses of a vehicle.

In certain cases the fluid springs are included in an open loop system having a compressor with its inlet connected to a low-pressure source such as the ambient environment and an outlet directly communicated with the fluid springs. In such systems the pressure in the fluid springs is maintained by a mechanically operated height controller that senses the changes in the height relationship between the sprung and unsprung mass of a vehicle and is operative when the vehicle is level to dump pressurized fluid from the fluid springs.

When the compressor is operated by an electric motor and wherein the system is operated to continuously dump the fluid springs, the electric motor drive can constitute a substantial drain on the vehicle battery.

For this reason, it is preferable that the compressor drive motor be operated only during periods when static load is added to the vehicle of a magnitude to cause a sustained deflection in the primary suspension components of a vehicle so as to move the sprung mass below a desired height relationship with the unsprung mass.

Another problem with vehicle leveling systems of the open loop type, is that under certain conditions continuous flow of fluid to the system from surrounding ambient can cause undesirable condensation and collection of moisture within the system.

Accordingly, an object of the present invention is to reduce electrical power consumption in a vehicle leveling system of the type including auxiliary pressurizable fluid spring components connected in an open loop between a high-pressure source and a low low-pressure point which loop is defined in part by an electric motor driven compressor and a height sensing mechanical controller that dumps fluid from the spring components by initiating a leveling operation every time passengers enter the vehicle and open and close its door and terminating the operation by deenergizing the motor when the vehicle is level and thereafter maintaining the motor deenergized to prevent it being a drain on the vehicle battery.

Another object of the present invention is to provide an improved semiautomatic door actuated vehicle leveling system including means operative when the vehicle door is opened and closed to initiate energization of an electric motor driven compressor that supplies pressurized fluid to fluid springs for leveling the vehicle and wherein once the springs are inflated to level the vehicle, a mechanically operated height controller will exhaust the springs to condition means that disconnect the motor from the vehicle battery until the vehicle doors are again opened and closed.

Still another object of the present invention is to reduce moisture collection in an open loop, vehicle leveling system by controlling fluid flow through the system to a period which is established by an electrical control module that initiates energization of a motor driven compressor during a pump-up phase of operation in response to vehicle door operation and terminates the operation of the electrically motor driven compressor and a pump-up phase when fluid is exhausted from the fluid springs of the leveling system by a mechanically operated height controller operated in accordance with the height relationship between the vehicle chassis and its rear axle assembly.

In one working embodiment of the invention the above objects and others are attained in a system having a pair of auxiliary load supporting fluid spring and shock absorber units. One of the combination units is adapted to be connected adjacent each one of the rear wheels of a vehicle between the lower frame of the vehicle and the housing of its rear axle assembly.

Each of the units includes an inflatable control chamber that is pressurized to produce a resultant uplifting force between the lower frame and the rear axle assembly of the vehicle to supplement the load carrying capacity of a pair of primary suspension springs.

The fluid springs are directly connected by a high-pressure supply conduit to an outlet from an electrically motor driven mechanical compressor that has its inlet connected to atmosphere. Exhaust from the fluid springs is controlled by a height sensing mechanical height controller that in the illustrated embodiment includes a mechanism directly connected to one of the auxiliary units.

The compressor is driven by an electric motor operated under the control of an electrical circuit that includes door switches on the vehicle. The door switches are of the type that close to complete an overhead lamp energization circuit when the vehicle doors are open and which are opened when the vehicle doors are closed so as to turn off the overhead lamp.

The circuit further includes a relay operated motor control switch that includes an electrically energizable component conditioned when the door switches have been opened and closed to be conditioned to complete a motor energization circuit during a pump-up phase of operation.

The circuit further has a pressure responsive switch therein maintained in a hold circuit for the energizable component of the relay switch. When the vehicle has been leveled and the height controller exhausts fluid therefrom back to a low-pressure region such as atmosphere the pressure-sensitive switch conditions the relay operated switch to deenergize the motor.

During vehicle operation and following pump-up, the electric motor is disconnected as a load on the vehicle battery.

When the vehicle is stopped and the door is opened and closed to disembark passengers therefrom, the leveling system again goes through a transient pump-up phase of operation followed by an exhaust of fluid from the height controller.

Further objects and advantages of the present invention will be apparent from the following description, reference being had to the accompanying drawings wherein a preferred embodiment of the present invention is clearly shown:

IN THE DRAWINGS

Figure 1:
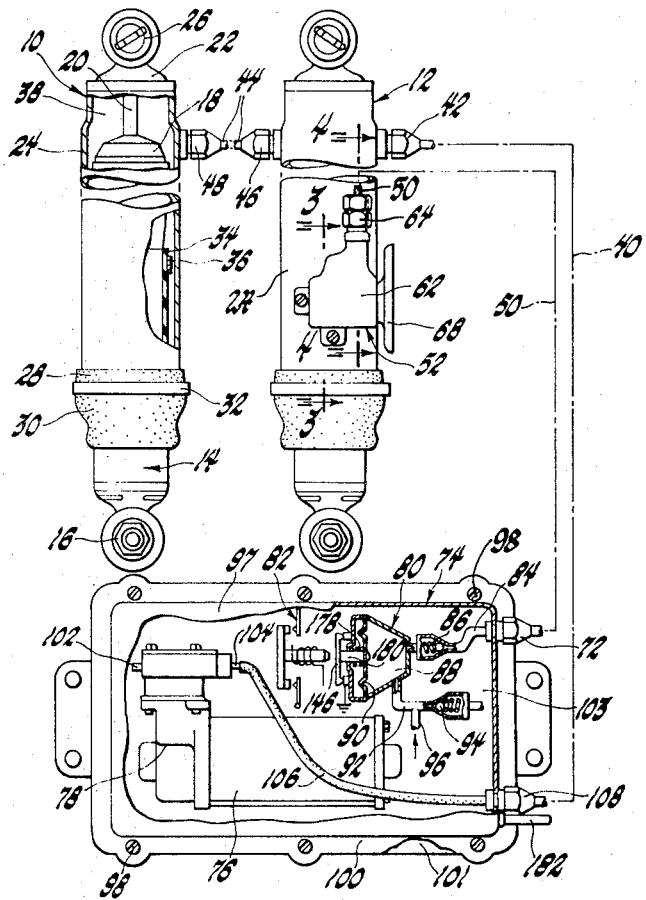
FIG. 1 is a diagrammatic view of a vehicle leveling system including the present invention.

Referring now to the drawings in FIG. 1 a pair of auxiliary load supporting suspension assemblies 10, 12 are illustrated. Each of the assemblies 10, 12 includes a shock absorber 14 having a bottom mount 16 adapted to be connected to an unsprung portion of a vehicle for example the housing of the axle of the rear suspension of the vehicle.

Each shock absorber 14 further includes an outer cylinder 18 that has a piston rod 20 extending upwardly thereof which is connected to the end closure 22 of a dust shield 24.

The closure 22 is connected to a top mount 26 that is adapted to connect the shock absorber 14 to a sprung component of the vehicle, for example, a point on the lower frame portion of the vehicle chassis where it extends over the axle housing of the rear suspension of the vehicle.

More particularly, in the illustrated embodiment of the invention, the dust shield 24 is a hollow, cylindrical sheet metal part that is arranged in surrounding telescoping relationship with the outer surface of the shock absorber cylinder 18. It has a lower end thereof connected to the outer end 28 of a flexible air spring sleeve 30 by a clamp ring 32.

The sleeve 30 is turned inwardly on itself into a space between the dust shield 24 and the outer surface of the cylinder 18. The innermost end 34 of the sleeve 30 is connected to the shock absorber cylinder 18 by a clamp ring 36.

The dust shield 24, sleeve 30 and shock absorbers cylinder 18 cooperate to define a sealed, variable volume pressurizable control chamber 38 within each of the assemblies 10, 12.

Each of the cylinders is connected to a high-pressure supply conduit 40 through means including an inlet fitting 42 on the side of the dust shield 24 of the assembly 12. The chamber 38 of assembly 12 is connected by a crossover tube 44 which is connected between fittings 46, 48 on the dust shield 24 of the respective assemblies 10, 12.

Additionally, the control chambers 38 are connected to an exhaust conduit 50 which is communicated with the control chamber 38 of the assembly 12 through a mechanically operated height controller 52 which is representatively illustrated as being a unit connected directly to the side of the dust shield 24 of assembly 12.

For purposes of the present invention the above-described details of the auxiliary load supporting suspension assemblies 10, 12 will suffice, it being understood they are merely representative of one suitable means that can be located between the sprung and unsprung masses of the vehicle to assist primary spring components such as rear located primary coil springs located between the lower frame of the vehicle and the ground engaging rear suspension assembly thereof. For a more detailed description of a combination shock absorber and air spring reference may be had to U.S. Pat. No. 3,063,702 of P. J. Long issued Nov. 13, 1962. The load supporting device could also be an inflatable bellows, a pressurizable piston cylinder arrangement and/or a hydropneumatic arrangement for producing a resultant uplifting force between the sprung and unsprung mass of a vehicle to compensate for deflection in the primary spring component thereof as produced when there are changes in the static loading on the sprung mass of the vehicle.

Figure 3:
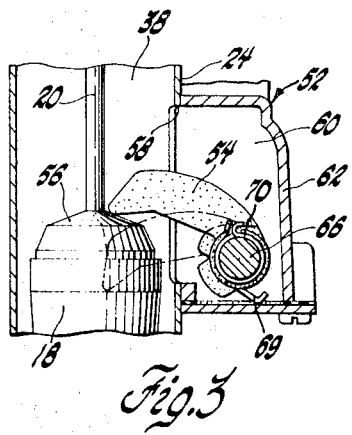
FIG. 3 is an enlarged vertical sectional view taken along line 3—3 of FIG. 1.

In accordance with certain principles of the present invention, the height controller 52 is of a type that includes cam operator 54 that is normally spring biased against the upper end 56 of the shock absorber cylinder 18 as is illustrated in FIG. 3.

When the cam operator 54 is in the illustrated solid line position, the height controller 52 positions valve means 55 so as to block communication between 60 and 64, a side port 58 in the dust shield 24 serves as a port to exhaust pressurized fluid from the control chamber 38 of assemblies 10, 12 into an internal chamber 60 within a housing 62 of the controller 52 which communicates with the inlet to the valve assembly 55 of the controller 52.

The outlet of the valve 55 is in communication with an exhaust or outlet fitting 64 on the housing 62 which is in turn fluidly communicated with the exhaust conduit 50.

Figure 4:
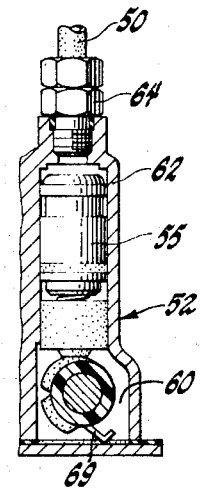
FIG. 4 is an enlarged vertical sectional view taken along the line 4—4 of FIG. 1 with valve details in elevation.

The cam operator 54 is coupled to a shaft 66 which is connected to a motion damper 68 of the controller 52 so as to damp movement of the shaft 66 in either direction of oscillation thereof about its longitudinal axis. A spring 69 urges cam operator 54 in a counterclockwise direction as viewed in FIGS. 3 and 4 against the damping action of damper 68.

The cam operator 54 is also coupled by a unidirectional spring clutch 70 when the cam operator 54 is rotated in a counterclockwise direction as viewed in FIG. 3 with respect to the shaft 66. Because of the dash pot 68, high frequency road induced movements between the unsprung and sprung mass that cause like movements between the dust shield 24 from the shock absorber 14 do not cause rapid oscillatory movement of the operating shaft 66 about its axis inwardly of chamber 38. Added static load causes the shield 24 and shock absorber 14 to move together to rotate cam operator 54 clockwise. This closes valve means 55 to trap pressurized fluid in chambers 38 and produce an uplifting force to overcome the added static load.

Under conditions where there is sustained overload on the vehicle sprung mass which causes the dust shield 24 and the shock absorber 18 to collapse on each other, the cam operator 54 will move in a clockwise direction as viewed in FIG. 3 into the chamber 60 and the spring clutch 70 will decouple it from the operating shaft 66 and serve as an overtravel mechanism.

When the vehicle sprung mass is moved above a desired position and the cam operator 54 is moved in a counterclockwise direction into the dotted line position shown in FIG. 3, the spring clutch 70 will couple the cam operator 54 to the operating shaft 66 and cause the valve means to be in an exhaust position wherein fluid will flow from the control chambers 38 through the exhaust line 50 to an inlet fitting 72 on a canister 74.

The canister 74 serves as an enclosure for an electric motor 76 connected to a reciprocating air compressor 78. It also encloses a pressure-responsive switch assembly 80 and a motor control switch 82.

A conduit 84 to the inlet fitting 72 is connected through a one-way check valve assembly 86 to a pressurizable control chamber 88 of the switch assembly 80 which is formed part by a movable diaphragm element 90.

The chamber 88 also has an outlet conduit 92 therefrom which communicates through a one way exhaust check valve 94 and a bleed orifice 96 to the interior of canister 74 which is at atmospheric pressure.

In the illustrated arrangement the canister 74 includes a cover 97 that is connected in place by a plurality of screw fasteners 98 located through peripheral flanges 100, 101 on the cover 97 and canister 74, respectively.

The system in which the suspension components 10, 12 is located is open in the sense that an inlet 102 to the compressor 78 is in direct communication with the interior 103 of the canister 74 at ambient pressure. It further includes an outlet 104 that communicates through a conduit 106 to an outlet fitting 108 on the canister 74 which is in fluid communication with the high-pressure supply conduit 40.

Figure 2:
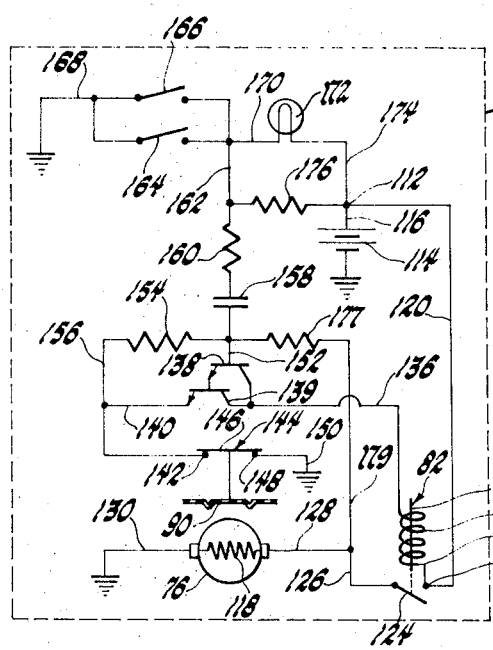
FIG. 2 is a diagrammatic view of an electrical control circuit used in association with the leveling system of FIG. 1.

Referring now to FIG. 2, the electric motor 76 is associated with an electrical control circuit 110 which operates the system in a semiautomatic fashion. More particularly, the system 110 includes an input terminal 112 connected to the positive terminal of a vehicle battery 114 by a conductor 116.

A primary energization circuit for the run winding 118 of the motor 76 is defined from terminal 112 through a conductor 120 thence to a fixed contact 122 of the relay operated motor control 82. It includes a movable contact carrying arm 124 that is electrically connected by conductors 126, 128 to one end of the run winding 118 which has the opposite end thereof electrically connected by a conductor 130 to ground.

Additionally, the circuit 110 includes a hold circuit for an electrically energizable coil 132 of the switch 82 which is in operative relationship with an armature 133. When the switch 124 is closed the coil 132 is energized through a circuit from terminal 112, thence through conductor 120 and a conductor 134 to one end of the coil 132. The opposite end of coil 132 is connected by a conductor 136 to the collectors of a pair of NPN transistors 138, 139 which has their emitters electrically connected by conductor 140 to a fixed contact 142 of a double-pole, single throw switch 144 connected to the movable diaphragm 90 of the pressure responsive switch 80.

A contact carrying arm 146 of electrically connected material in switch 144 is connected to bridge the contact 142 and a second fixed contact 148 which in turn is electrically connected by a conductor 150 to ground.

In the illustrated arrangement the NPN transistors 138, 139 are maintained nonconductive until a predetermined current pulse is directed through a conductor 152 to the base of the transistor 138.

A resistor 154 connected to the base of transistor 138 is connected by a conductor 156 to the pressure-responsive switch 82 to prevent current leakage through a capacitor 158 from triggering the transistors 138, 139. The capacitor 158 is electrically connected to a resistor 160 thence through a conductor 162 to one side of a plurality of door operated overhead lamp switches 164, 166 of the single-pole, single throw type. The opposite side of the switches 164, 166 are connected by a conductor 168 to ground.

Each of the switches 164, 166 is electrically connected by a conductor 170 to an electrically energizable lamp 172 which is connected by a lead 174 to the terminal 112.

A resistance 176 is connected in shunt relationship to the lamps 170, 172 to maintain the controller operative in case the lamp 172 burns out.

Further, the circuit includes a resistor 177 electrically connected between the base of the transistor 138 and the conductor 128 by means of a conductor 179. The resistor 177 serves to maintain a predetermined base current to the NPN transistors 138, 139 once they are triggered conductive.

By virtue of the above described circuit 110 the system in FIG. 1 is operated each time the vehicle doors open and close.

More particularly, when the vehicle doors are closed the switches 164, 166 are opened to disconnect the resistors 176, 160 to ground. As a result, the capacitor 158 is charged by the battery 114.

When the vehicle doors are opened, a ground circuit is completed with the capacitor 158 discharging through resistance 160, the conductor 162 thence through switches 164, 166 and conductor 168 to ground and back to the negative capacitor terminal conductor 152 through switch 144. Resistor 154 is shunt to armature 118 and resistor 177. When doors are reclosed capacitor 158 is recharged from battery 114 through lamp 172. As a result, a current pulse occurs on the base of the NPN transistor 138 through the conductor 152.

As a result, the transistors 138, 139 are energized to complete the aforedescribed energization circuit for the coil 132. As was previously noted, the circuit runs from the positive terminal of the battery 114 thence through the coil 132, the conductive transistors 138, 139 thence through the normally closed pressure switch 80 to ground.

Accordingly, the relay operated switch 82 has the armature 133 thereof attracted by the energized coil 133 in a direction to cause the movable switch blade 124 to electrically engage the contact 122 thereby to complete the aforedescribed primary energization circuit for the run winding 118.

As a result, once the vehicle has been loaded, as is the case when passengers enter the vehicle, and open and close the door switches as mentioned above, the motor 76 drives the compressor 78 to draw ambient air into the intake 102 thence to be discharged at a higher pressure through the discharge conduit 106 and the high-pressure supply line 40 into the control chambers 38 of the auxiliary suspension units 10, 12.

A resultant supplemental uplifting force is then produced between the bottom and top mounts 16, 26 of the assemblies 10, 12 which helps to correct deflections produced in primary suspension springs by the addition of the load on the vehicle.

During this phase of operation which henceforth shall be referred to as the "pumpup" phase of operation, the cam operator 54 of the controller 52 is as illustrated in solid lines in FIG. 3 or is shifted even more interiorly of the chamber 60 of the controller 52. As mentioned above, this will condition the valve means 55 of the controller 52 to block exhaust of fluid from the control chambers 38 into the exhaust conduit 50.

When the deflection in the primary spring that is produced by the added load on the vehicle is corrected by the auxiliary load supporting device, the cam operator 54 is shifted into the dotted lines position as shown in FIG. 3 thereby to cause the valve means 55 of the controller 52 to open and exhaust fluid from the control chambers 38 of the assemblies 10, 12.

The exhausted fluid passes through the conduit 50 thence through the inlet fitting 72 and across the check valve 86 into the operating chamber 88 of the pressure switch 80.

The pressure flow into the chamber 88 does not occur until the vehicle is slightly above the desired predetermined height relationship between the sprung and the unsprung mass. This is due to the damping action of the damper assembly 68 of the controller 52 which produces a predetermined delay after leveling of the vehicle before the cam operator 54 assumes the dotted line position of FIG. 3.

The resultant operation is to cause the movable diaphragm 90 to compress a return spring 178 of the assembly 80. Spring 178 is in surrounding relationship with a stem 180 of electrically insulating material which is slidably directed through the housing of the assembly 80 to movably position the conductor blade 146 into an open position when the spring 178 is so compressed.

At this point the hold circuit for maintaining energization of the coil 132 is interrupted. As a result, the armature 133 is biased by spring means (not shown) to shift the movable blade 124 of the motor control switch 82 open.

Consequently, the primary energization circuit from the DC power source represented by the battery 114 through the run winding 118 to ground is interrupted.

As a result, the operation of the motor 76 is terminated as well as that of the compressor 78. The pressurization of the chamber 88 and the resultant termination of the compressor operation occurs substantially simultaneously with movement of the vehicles sprung mass slightly above the desired height relationship with the unsprung mass or slightly above a "level" position. For a limited period of time pressurized fluid continues to exhaust from the control chambers 38 through the height controller 52, the exhaust conduit 50, thence into the operating chamber 88 and thereby to flow through the exhaust conduit 92 and the exhaust check valve 94 to atmosphere.

The exhaust check valve 94 defines a relatively large exhaust port for flow of high-pressure fluid from the control chambers 38 following the aforedescribed pump-up phase of operation.

Once the vehicle chassis has returned to a desired height relationship with its suspension the height controller 52 will have its cam operator positioned in the solid line location of FIG. 3 thereby to condition valve means 55 to block communication between the control chambers 38 and the exhaust conduit 50. At this time pressurized fluid in the operating chamber 88 is pressed outwardly therefrom by the diaphragm 90 being returned by the spring 178 into a position wherein the double-pole, single throw switch 144 is closed as illustrated in FIGS. 1 and 2. The force of the spring 178 is less than that required to open the outlet check valve 94 and the orifices outlet 96 serves as a means to bleed off the chamber 88 following operation of the electrical control circuit 110 which causes the "pumpup" phase of operation.

Another phase of operation of the illustrated leveling system and controller occurs when a static load is removed from the vehicle as for example when passengers disembark therefrom.

At this point the doors are again opened and closed. When the doors are opened the door switches 164, 166 are closed to actuate the vehicle lamp 172. Further, they serve to discharge the capacitor 158 to ground. Concurrently, the primary suspension springs of the vehicle will extend because of the reduction in the static load thereon to urge the end mounts 16, 26 of the auxiliary load supporting assembly 10, 12 apart from one another. This causes the dust shield 24 of each of the assemblies to move apart from the upper ends 56 of the shock absorber 16 thereof. As a result, the cam operator 54 is urged by spring 69 in the counterclockwise direction against the damping force of the dashpot 68 into the dotted line position at which time the controller 52 valve means 55 is conditioned to open communication between the control chambers 38 and the exhaust conduit 60.

It constitutes the beginning of an "exhaust" phase of operation wherein the excessive pressure within the control chambers 38 is dumped through the exhaust conduit 50 and the operating chamber 88 of the pressure responsive switch 80 thence through the exhaust check valve 94 into the open interior 103 of the canister 74 from whence the exhaust fluid flows through an outlet line 182.

During exhaust phase of operation it is possible that the vehicle door will be closed so as to discharge the capacitor 158 of the controller 110 and thereby produce a pulse to the base of the transistor 138. Because of the pressure buildup in the operating chamber 88 produced by the exhaust flow of pressurized fluid, the switch 144 of the hold circuit is opened and as a result, the relay operated switch 124 remained opened. Consequently, the run winding 118 remains deenergized and as a result there is no significant battery drain through the circuit 110 during the exhaust phase of operation.

Still another phase of operation of the above-described leveling system and control circuit is that which occurs when the vehicle is level and being operated. During this phase of operation the vehicle is subjected to high frequency road movements between the sprung and unsprung mass that cause the dust shield 24 and shock absorber cylinder 18 to be moved toward and away from one another at a corresponding frequency.

When the dust shield 14 and shock absorber 18 are moved away from one another during movement of the sprung mass away from the unsprung mass the upper end 56 of the cylinder 18 will move downwardly from the cam operator 54 when it is in the solid line position illustrated in FIG. 3. The cam operator 54 is damped against a movement in the counterclockwise direction that would cause it to immediately follow the upper end 56 of the shock absorber 18. As a result, the valve means 55 of the controller 52 is maintained stable for a predetermined delay period. This delay is of a duration greater than that time required to move the sprung mass upwardly away from the unsprung mass because of road movements.

The separating movement is rapidly followed by a return movement of the sprung mass with respect to the unsprung mass which causes the dust shield 24 to move toward the upper end 56 of the shock absorber 18 a distance wherein the end 56 of the shock absorber 18 will engage the cam operator in its solid line position of FIG. 3 and move it interiorly of the chamber 60. This movement occurs without damping since the cam operator 54 is decoupled by the unidirectional clutch spring 72 from the operating shaft 66 and damper 68. The mechanical details of the controller 52 form no part of the present invention and the controller 52 itself is representative of one suitable multipositioned, damped, mechanically operated height controller that can be used in the open loop semiautomatic leveling system of FIG. 1. Another suitable type of controller adapted for use in a system of this type is shown in U. S. Pat. No. 2,967,547 to Pribonic et al., issued Jan. 10, 1961.

While the pumpup phase of operation in the illustrated arrangement is initiated by opening and closing an overhead lamp switch associated with a vehicle door, the principles of the present invention contemplate the inclusion of any mechanically operated switch at the location of the door switches 64, 66 that will open and close to give a like result.

In the working embodiment of the invention illustrated in FIGS. 1 through 4, the component parts of the control circuit 110 have the following ratings:

| Component | Rating |
| --- | --- |
| Capacitor 158 | 100 microfarads at 25 volts. |
| Resistor: | |
| 160 | 1 K ohms ½ watt. |
| 176 | Do. |
| 178 | Do. |
| 154 | Do. |
| Motor 118 | 5 amps at 12 volts. |
| Compressor 46 | .136 cu. in. displacement. |
| Combination shock absorber and air spring assemblies 10, 12. | 10-125 p.s.g. |

In one working embodiment of the system having the aforedescribed components a maximum distributed static load of from 1,100 to 1,200 pounds is corrected within 2½ minutes. Following removal of the load the time period of correction to return the vehicle to level or a desired predetermined height relationship is less than 1 minute.

Further advantages of the above-described system is that it does not affect the characteristics of the vehicle in that the spring rate of assemblies 10, 12 is in parallel with that of the primary suspension springs. Further, the space required to locate the canister 74 within the operative environment is small. As a result, it can be easily located within the engine compartment without encroaching on space occupied by other vehicle accessories.

A further feature of the above-described arrangement is that it operates without affecting the intake manifold pressure of the vehicle or other component parts of the vehicle connected with operation of an internal combustion engine.

Yet another advantage is that the electric motor of the combination is energized only as required to pump up the vehicle. Otherwise, the electric motor is completely disconnected from the electrical system of the vehicle to minimize drain on the vehicle battery.

The aspect of the invention that requires both door opening and closing to condition the circuit is a vehicle use factor that is generally related to a load change that requires correction and as such causes the system to be operative only when necessary.

Further, the control circuit 110 as described above enables the doors of the vehicle to be opened without conditioning the circuit to connect the electric motor to the vehicle battery and thereby constitute a drain from the vehicle.

While embodiments of the present invention, as herein disclosed constitute preferred forms, it is to be understood that other forms might be adopted.

We claim:

1. A semiautomatic vehicle leveling system for maintaining a predetermined height relationship between the sprung and unsprung mass of a vehicle comprising: fluid spring means adapted to be connected between the sprung and the unsprung mass of a vehicle for maintaining a predetermined height relationship therebetween, a pressure source including a compressor having its outlet connected directly to said fluid spring means, an electric motor for driving said compressor to increase the pressure level in said fluid spring means to compensate for increased static loading on the sprung mass of a vehicle, circuit means operative to energize said electric motor including a motor control switch having an energizable component for maintaining said motor energized during a pump-up phase of operation, a hold circuit for said energizable component including a three terminal switching device, means including manually operated switch means for conditioning said three terminal switching device to initiate the pump-up phase of operation, a height controller responsive to a predetermined height correction to direct fluid from said fluid spring means, pressure responsive switch means connected to said height controller and operative upon fluid being exhausted from said fluid spring means to condition said hold circuit so as to deenergize said motor to terminate the pump-up phase of operation.

2. A semiautomatic vehicle leveling system for maintaining a predetermined height relationship between the sprung and the unsprung mass of a vehicle having a door comprising: fluid spring means adapted to be connected between the sprung and the unsprung mass of vehicle for maintaining a predetermined height relationship therebetween, a pressure source including a compressor having its outlet connected directly to said fluid spring means, an electric motor for driving said compressor to increase the pressure level in said fluid spring means to compensate for increased static loading on the sprung mass of a vehicle, circuit means operative to energize said electric motor including a vehicle door switch and means responsive to door switch operation to complete the energization circuit means for said motor following door closure to initiate a pump-up phase of operation, a height controller responsive to a predetermined height correction to direct fluid from said fluid spring means, pressure-responsive switch means fluidly connected to said height controller and operative upon fluid being exhausted from said fluid spring means to condition said circuit means so as to deenergize said motor to terminate the pump-up phase of operation.

3. A semiautomatic vehicle leveling system for maintaining a predetermined height relationship between the sprung and the unsprung mass of a vehicle comprising; fluid spring means adapted to be connected between the sprung and the unsprung mass of vehicle for maintaining a predetermined height relationship therebetween, a pressure source including a compressor having its outlet connected directly to said fluid spring means, an electric motor for driving said compressor to increase the pressure level in said fluid spring means to compensate for increased static loading on the sprung mass of a vehicle, circuit means operative to energize said electric motor to produce the increase in pressure of said fluid spring means during a pump-up phase of operation including manually operated start switch means to initiate the pump-up phase of operation, said circuit means including a relay-operated switch having a coil energizable to condition said relay switch to control motor energization, a hold circuit for said coil including a three terminal switching device and a pressure responsive switch, said switching device being operative in response to actuation of said start switch means to maintain said coil conditioned to cause said relay switch to maintain said motor energized during the pump-up phase of operation, a height controller responsive to a predetermined height relationship between the sprung and unsprung mass following pumpup and operative to exhaust a predetermined amount of fluid from said fluid spring means, said pressure-responsive switch operative upon fluid being exhausted from said fluid spring means to condition said holding circuit switch so as to deenergize said coil to terminate motor energization and the pump-up phase of operation.

4. A semiautomatic leveling system for maintaining a predetermined height relationship between the sprung and the unsprung mass of a vehicle comprising; fluid spring means adapted to be connected between the sprung and the unsprung mass of vehicle for maintaining a predetermined height relationship therebetween, a pressure source including a compressor having its outlet connected directly to said fluid spring means, an electric motor with a run winding for driving said compressor to increase the pressure level in said fluid spring means to compensate for increased static loading on the sprung mass of a vehicle, a battery having a positive terminal, a primary energization circuit for said motor including a motor control switch electrically connecting said positive terminal to said run winding, said motor control switch having an electrically energizable component, a hold circuit for said component including a three terminal semiconductor switching device and a normally closed pressure-responsive switch, a height controller operative upon a predetermined height correction to direct fluid from said spring means to said pressure-responsive pressure-responsive switch to condition it to deenergize the energizable component of the motor control switch, said semiconductor switching device having a control terminal, pulse-forming circuit means including a capacitor electrically connected to said positive terminal of the battery, means including a manually-operated start switch normally open to cause said capacitor to be charged by said vehicle battery, said start switch being closed and then being reopened to initiate the beginning of a pump-up phase by conditioning said capacitor to be recharged on switch opening to thereby trigger said semiconductor switching device conductive, means for maintaining a signal on said control terminal of said semiconductor switching device during a pump-up phase to maintain said hold circuit, said pressure responsive switch maintaining said hold circuit until fluid is exhausted from the fluid spring means and being conditioned thereby to open said hold circuit to terminate the pump-up phase.

5. A semiautomatic leveling system for maintaining a predetermined height relationship between the sprung and the unsprung mass of a vehicle comprising; fluid spring means adapted to be connected between the sprung and the unsprung mass of vehicle for maintaining a predetermined height relationship therebetween, a pressure source including a compressor having its outlet connected directly to said fluid spring means, an electric motor with a run winding for driving said compressor to increase the pressure level in said fluid spring means to compensate for increased static loading on the sprung mass of a vehicle, a battery having a positive terminal, a primary energization circuit for said motor including a motor control switch electrically connecting a positive terminal of a battery to said run winding, said motor control switch having an electrically energizable component, a hold circuit for said component including a three terminal semiconductor switching device and a normally closed pressure-responsive switch, a height controller operative upon a predetermined height correction to direct fluid from said spring means to said pressure-responsive switch to condition it to deenergize the energizable component of said motor control switch, said semiconductor switching device having a control terminal, pulse-forming circuit means including a capacitor electrically connected to the positive terminal of the battery, a door switch maintained normally open when the door of a vehicle is closed to cause said capacitor to be charged by said vehicle battery, said door switch being closed when the door is open and electrically connected to ground for discharging said capacitor to trigger said semiconductor switching device conductive when the vehicle door is closed, means for maintaining a signal of said control terminal of said semiconductor switching device during a pump-up phase of operation to maintain said hold circuit, said pressure-responsive switch maintaining said hold circuit until fluid is exhausted from said fluid spring means and being conditioned thereby to open said hold circuit to terminate the pump-up phase.

6. An electrical circuit for controlling an electric drive motor in a semiautomatic vehicle leveling system comprising; a primary energization circuit including a motor control switch for electrically connecting a positive battery terminal to the run winding of the motor, said motor control switch having an electrically energizable component, a hold circuit for said component including a three terminal semiconductor switching device and a normally closed pressure-responsive switch operative upon a change in the static loading on the vehicle to deenergize the energizable component of the motor control switch, said semiconductor switching device having a control terminal, pulse-forming circuit means including a capacitor adapted to be electrically connected to the positive terminal of the battery, a manually operated start switch maintained normally open to cause said capacitor to be charged by the vehicle battery, said start switch being closed and then being reopened to initiate the beginning of a pump-up phase by conditioning said capacitor to be recharged on switch opening to trigger said semiconductor switching device conductive, means for maintaining a signal on said control terminal of said semiconductor switching device during a pump-up phase to maintain said hold circuit, said pressure responsive switch maintaining said hold circuit, until fluid is exhausted from the fluid spring means and being conditioned thereby to open said hold circuit.

PO-1050
(5/69)

UNITED STATES PATENT OFFICE
CERTIFICATE OF CORRECTION

Patent No. 3,575,442          Dated April 20, 1971

Inventor(s) James O. Elliott, James E. Whelan

It is certified that error appears in the above-identified patent and that said Letters Patent are hereby corrected as shown below:

Column 1, line 24, "When" should be -- Where --;
          line 44, "low-pressure" should be -- pressure --.
Column 4, line 25, after "formed" insert -- in --.
Column 6, line 48, "orifices" should be -- orificed --.
Column 7, line 21, after "shield" change "14" to -- 24 --.
Column 9, line 54, delete one occurrence of "pressure-respo Signed and sealed this 26th day of October 1971.

(SEAL)
Attest:

EDWARD M. FLETCHER, JR.          ROBERT GOTTSCHALK
Attesting Officer                  Acting Commissioner of Patents